US012033444B2

(12) United States Patent
Tsuchiya et al.

(10) Patent No.: US 12,033,444 B2
(45) Date of Patent: Jul. 9, 2024

(54) KNOCKING DETERMINATION DEVICE AND KNOCKING CONTROL DEVICE

(71) Applicant: DENSO CORPORATION, Kariya (JP)

(72) Inventors: Yuuki Tsuchiya, Kariya (JP); Masanori Kurosawa, Kariya (JP); Kou Tanaka, Kariya (JP); Kazuhiro Nishigaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 148 days.

(21) Appl. No.: 17/894,749

(22) Filed: Aug. 24, 2022

(65) Prior Publication Data

US 2022/0406102 A1 Dec. 22, 2022

Related U.S. Application Data

(63) Continuation of application No. PCT/JP2021/005021, filed on Feb. 10, 2021.

(30) Foreign Application Priority Data

Feb. 26, 2020 (JP) .................. 2020-030926

(51) Int. Cl.
*G01M 15/12* (2006.01)
*G07C 5/08* (2006.01)

(52) U.S. Cl.
CPC ........... *G07C 5/0808* (2013.01); *G01M 15/12* (2013.01)

(58) Field of Classification Search
CPC .................................................. G01M 15/12
See application file for complete search history.

(56) References Cited

U.S. PATENT DOCUMENTS

| | | | | |
|---|---|---|---|---|
| 5,311,765 A | * | 5/1994 | Iwakiri | G01L 23/225 73/114.02 |
| 7,942,040 B2 | * | 5/2011 | Kaneko | F02P 5/152 73/35.01 |
| 8,096,166 B2 | | 1/2012 | Masuda et al. | |
| 2001/0015198 A1 | | 8/2001 | Kokubo et al. | |
| 2006/0236753 A1 | * | 10/2006 | Yoshihara | G01L 23/225 701/111 |
| 2007/0000307 A1 | * | 1/2007 | Yoshihara | G01L 23/225 73/35.09 |
| 2007/0016387 A1 | * | 1/2007 | Takemura | F02D 35/027 701/111 |
| 2010/0162794 A1 | * | 7/2010 | Kaneko | G01L 23/225 73/35.09 |
| 2011/0257872 A1 | * | 10/2011 | Masuda | G01L 23/225 701/111 |

(Continued)

FOREIGN PATENT DOCUMENTS

| | | |
|---|---|---|
| JP | H03258955 A | 11/1991 |
| JP | 2001-227400 | 8/2001 |

(Continued)

*Primary Examiner* — Eric S. McCall (74) *Attorney, Agent, or Firm* — Nixon & Vanderhye P.C.

(57) ABSTRACT

A knocking determination device detects a vibration generated in an internal combustion engine during a predetermined period in each combustion cycle of the internal combustion engine. The knocking determination device performs a knocking determination of a presence or absence of a knock based on a vibration waveform in a predetermined frequency band component of the vibration detected.

11 Claims, 8 Drawing Sheets

(56) References Cited

U.S. PATENT DOCUMENTS

2014/0041439 A1\* 2/2014 Matsushima ......... G01L 23/226
73/35.09

FOREIGN PATENT DOCUMENTS

| JP | 2006-336604 | 12/2006 |
|----|-------------|---------|
| JP | 2020-45827  | 3/2020  |
| JP | 2020-45828  | 3/2020  |

\* cited by examiner

KNOCKING DETERMINATION DEVICE AND KNOCKING CONTROL DEVICE

CROSS REFERENCE TO RELATED APPLICATIONS

The present application is a continuation application of International Patent Application No. PCT/JP2021/005021 filed on Feb. 10, 2021, which designated the U.S. and claims the benefit of priority from Japanese Patent Application No. 2020-030926 filed on Feb. 26, 2020. The entire disclosures of all of the above applications are incorporated herein by reference.

TECHNICAL FIELD

The present disclosure relates to a knocking determination device that determines, as a knocking determination, the presence or absence of a knock in an internal combustion engine, and a knocking control device that controls to suppress the knock based on the result of the knocking determination.

BACKGROUND

Some knocking determination devices have a detection unit and a knocking determination unit. The detection unit detects a vibration generated in the internal combustion engine during a predetermined period in each combustion cycle of the internal combustion engine. The knocking determination unit performs a knocking determination based on whether or not a feature of a vibration waveform in a predetermined frequency band component of the detected vibration matches with a feature of a knocking waveform.

SUMMARY

The present disclosure provides a knocking determination device. The knocking determination device detects a vibration generated in an internal combustion engine during a predetermined period in each combustion cycle of the internal combustion engine. The knocking determination device performs a knocking determination of a presence or absence of a knock based on a vibration waveform in a predetermined frequency band component of the vibration detected.

BRIEF DESCRIPTION OF DRAWINGS

The features and advantages of the present disclosure will become more apparent from the following detailed description made with reference to the accompanying drawings. In the drawings.

DETAILED DESCRIPTION

For example, in a knocking determination device, when a plurality of noises are generated during a predetermined period, the knocking determination is performed based on whether or not a feature of a vibration waveform as a whole including the plurality of noises matches with a feature of the knocking waveform. Therefore, even though the vibration waveform is caused by the plurality of noises, the feature of the vibration waveform may be erroneously determined as the feature of one knocking waveform. In addition, when both noise and knock occur during a predetermined period, the knocking determination is performed based on whether or not the feature of the vibration waveform as a whole including both the noise and knock matches with the feature of the knocking waveform. Therefore, even though the vibration waveform is caused by both the noise and knock, the feature of the vibration waveform may be erroneously determined as the feature of one knocking waveform.

The present disclosure provides a knocking determination device and a knocking control device that suppresses erroneous determination that a vibration waveform caused by a plurality of noises is regarded as a feature of one knocking waveform, and erroneous determination that a vibration waveform caused by noise and knock is regarded as a feature of one knocking waveform, and improves an accuracy of knock determination.

An exemplary embodiment of the present disclosure provides a knocking determination device that includes a detection unit, a knocking determination unit, an end determination unit, and a feature extraction unit. The detection unit is configured to detect a vibration generated in an internal combustion engine during a predetermined period in each combustion cycle of the internal combustion engine. The knocking determination unit is configured to perform a knocking determination of a presence or absence of a knock based on a vibration waveform in a predetermined frequency band component of the vibration detected. The end determination unit configured to determine an end of an individual waveform that is a waveform of each predetermined series of vibrations included in the vibration waveform, and recognize a boundary between the individual waveforms. The feature extraction unit configured to perform an extraction work that extracts a feature of the individual waveform based on recognizing the boundary. The knocking determination unit determines whether the feature of the individual waveform matches with a feature of a knocking waveform, and determines that the knock exists on condition that the knocking determination unit determines that the feature of the individual waveform matches with the feature of the knocking waveform.

In the exemplary embodiment of the present disclosure, the configuration determines that a knock exists on condition that the feature of any of the individual waveforms included in the vibration waveform is determined to be the feature of the knocking waveform. Therefore, compared to the case where the knocking determination is performed based on whether or not the feature of the whole set of vibration waveforms matches with the feature of the knocking waveform, the configuration can suppress the erroneous determination that the vibration waveform including a plurality of noises is regarded as one knocking waveform and the erroneous determination that the vibration waveforms including both noise and knock is regarded as one noise waveform. Therefore, the accuracy of knocking determination can be improved.

Embodiments of the present disclosure will now be described with reference to the drawings. It is noted that, the present disclosure is not limited to the embodiments and may be implemented with appropriate modification without departing from the gist of the disclosure.

First Embodiment

Figure 1:
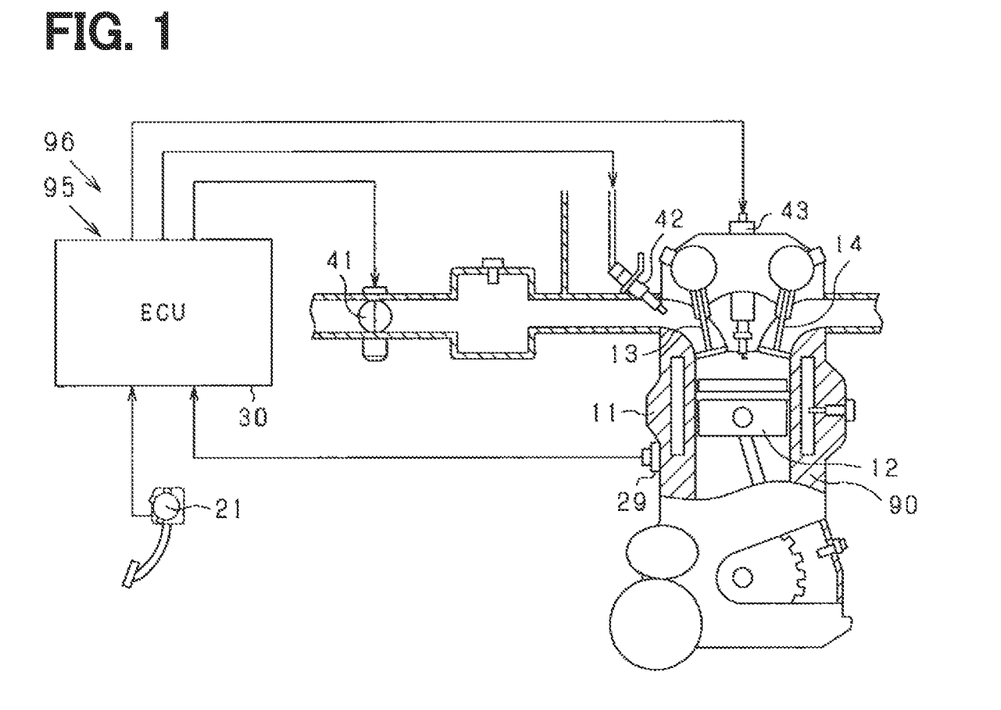
FIG. 1 is a schematic view showing a knocking determination device of a first embodiment and its surroundings.

FIG. 1 is a cross-sectional view showing an internal combustion engine 90 in which a knocking determination device 95 and a knocking control device 96 of the present embodiment are installed. The internal combustion engine 90 includes an engine block 11, a piston 12, an intake valve 13, an exhaust valve 14, and the like. An electronic throttle 41, an injector 42, an ignition coil 43, an ECU 30 for controlling them, and the like are installed in the internal combustion engine 90.

The (Electronic Control Unit) ECU 30 inputs a speed request from the driver via an accelerator sensor 21. Based on the input, the ECU 30 controls a quantity of air, a quantity of fuel, an ignition timing, for example. Specifically, the ECU 30 controls the quantity of air by controlling the electronic throttle 41, controls the quantity of fuel by controlling the injector 42, and controls the ignition timing by controlling the ignition coil 43.

A detection unit 29 is installed in the engine block 11. The detection unit 29 detects the vibration generated in the internal combustion engine 90 during a gate period G which is a predetermined period in each combustion cycle of the internal combustion engine 90. The gate period G is a period during which when knock occurs in the internal combustion engine 90, vibration due to the knock occurs. Specifically, the gate period G is a predetermined 60 CA (crank angle) period during an expansion stroke.

Figure 2:
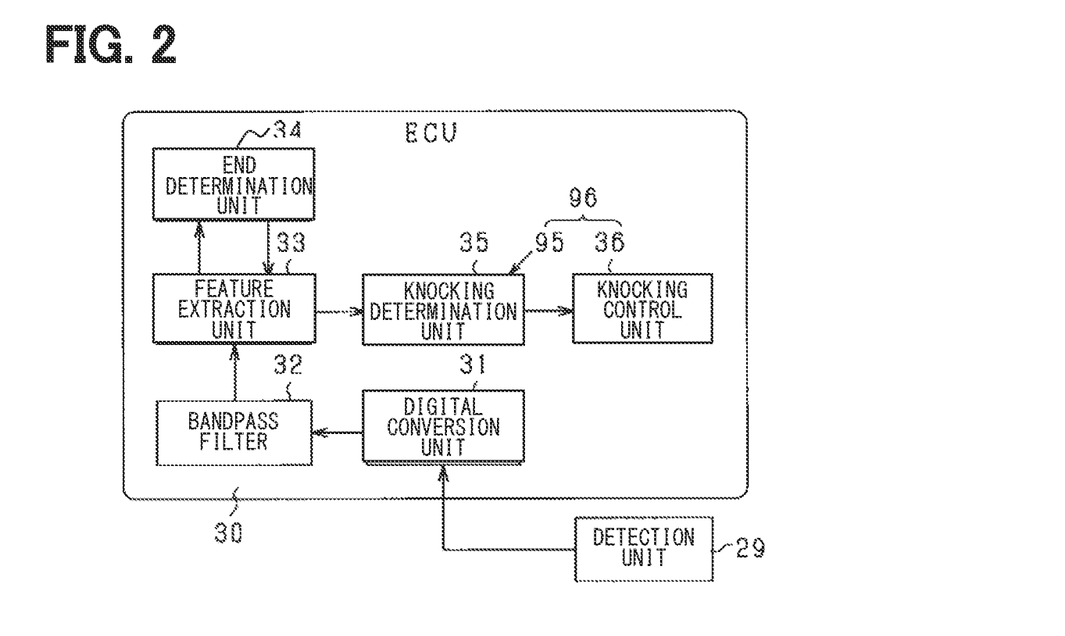
FIG. 2 is a block diagram showing the knocking determination device and its surroundings.

FIG. 2 is a block diagram showing a knocking determination device 95 and a knocking control device 96. The ECU 30 includes a digital conversion unit 31, a bandpass filter 32, a feature extraction unit 33, an end determination unit 34, a knocking determination unit 35, and a knocking control unit 36.

The detection unit 29, the digital conversion unit 31, the bandpass filter 32, the feature extraction unit 33, the end determination unit 34, and the knocking determination unit 35 constitute the knocking determination device 95. The knocking determination device 95 and the knocking control unit 36 constitute the knocking control device 96.

The detection unit 29 detects the vibration generated in the internal combustion engine 90 during the gate period G with an analog signal. The digital conversion unit 31 digitally converts the analog signal. The bandpass filter 32 extracts a predetermined frequency band (for example, about 14 kHz±1 kHz) component from the vibration waveform in the digitally converted vibration information. Specifically, the bandpass filter 32 extracts a vibration in the predetermined frequency band by extracting a vibration having a predetermined lower limit frequency (for example, about 14 kHz−1 kHz) or more and a predetermined upper limit frequency (for example, about 14 kHz+1 kHz) or less.

In the following, each predetermined series of vibration waveforms included in the vibration waveform of the vibrations extracted by the bandpass filter 32 will be referred to as "individual waveform Wo". The end determination unit 34 determines an end of each individual waveform Wo and recognizes a boundary between the individual waveforms Wo. The feature extraction unit 33 performs an extraction work of features Ps, Pm, and Pe of each individual waveform Wo based on the recognition of the boundary.

Specifically, the feature extraction unit 33 first extracts a provisional feature in one individual waveform Wo. Then, on condition that the end determination unit 34 determines that the one individual waveform Wo has ended, the feature extraction unit 33 determines the provisional features of the one individual waveform Wo as the formal features Ps, Pm, and Pe, and starts the extraction work of the provisional features of the next individual waveform Wo. That is, the features Ps, Pm, and Pe are formally extracted by the formal determination. That is, the feature extraction unit 33 extracts the provisional features of the individual waveform Wo and determines the provisional features as the formal features Ps, Pm, and Pe, as the extraction work of the features Ps, Pm, and Pe of the individual waveform Wo.

The knocking determination unit 35 determines whether or not the extracted feature in the individual waveform matches with a feature of the knocking waveform. Then, the knocking determination unit 35 determines that the knock exists on condition that any of the features in the individual waveform is determined as the feature of the knocking waveform. On the other hand, when none of the features of the individual waveform Wo is determined as the feature of the knocking waveform, the knocking determination unit 35 determines that the knock does not exist.

The knocking control unit 36 performs normal control that allows the ECU 30 to control the internal combustion engine 90 at a normal ignition timing unless the knocking determination unit 35 determines that the knock exists. On the other hand, when the knocking determination unit 35 determines that knock exists, the knocking control unit 36 performs knocking suppression control that delays the ignition timing as compared with the case of normal control.

Figure 3:
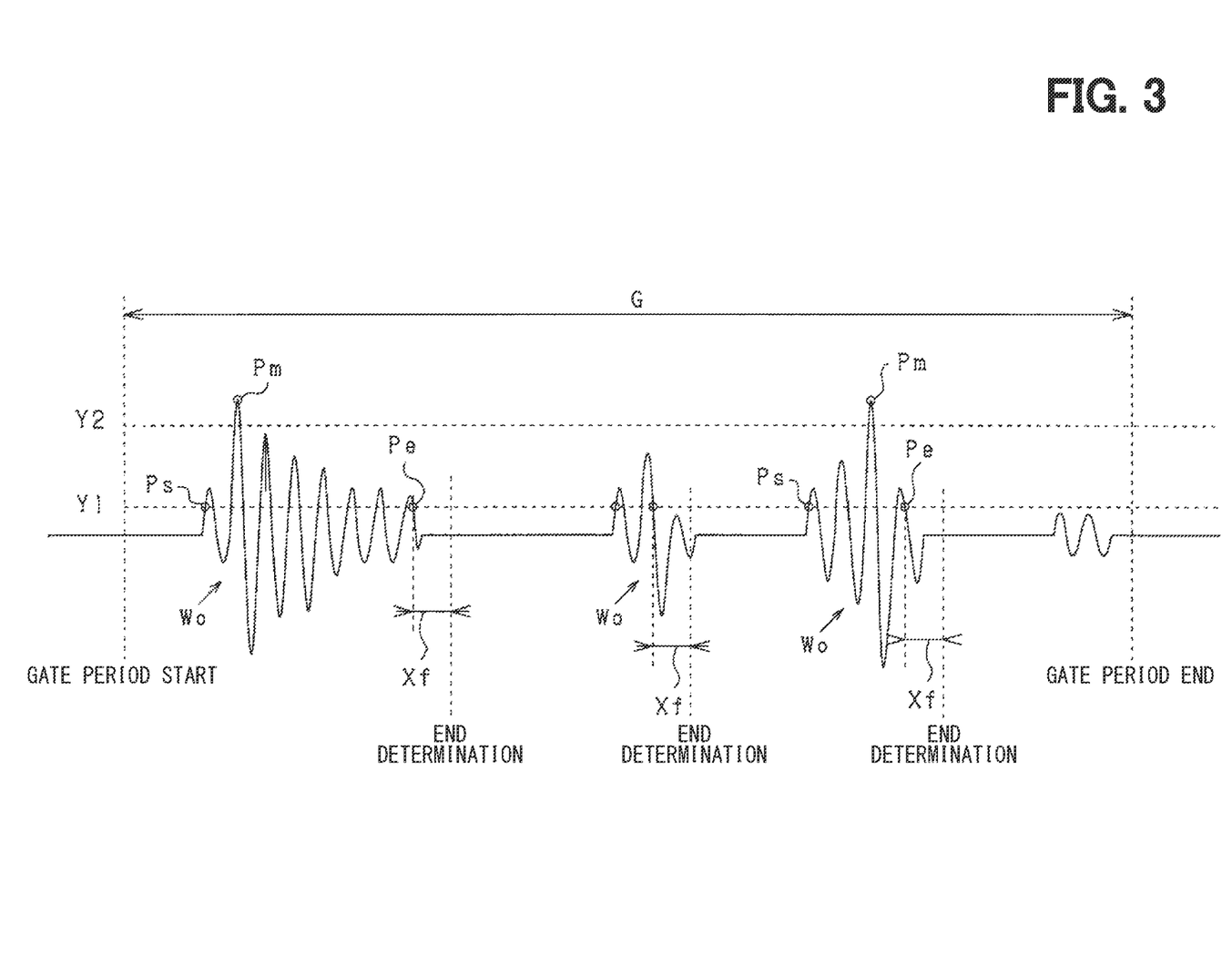
FIG. 3 is a graph showing an example of a vibration waveform including a plurality of individual waveforms.

FIG. 3 is a graph showing an example of a vibration waveform including a plurality of individual waveforms Wo. The horizontal axis of the graph shows time, and the vertical axis of the graph shows vibration intensity.

The feature extraction unit 33 extracts a provisional start point, a provisional maximum point, and a provisional end point as provisional features of the individual waveform Wo. Then, on condition that the end determination unit 34 determines that the one individual waveform Wo has ended, the provisional start point, the provisional maximum point, and the provisional end point of the one individual waveform Wo are determined as the formal start point Ps, the maximum point Pm, and the end point Pe, respectively. In the following, the provisional start point, the provisional maximum point, and the provisional end point are referred to as "provisional three points", and the start point Ps, the maximum point Pm, and the end point Pe are referred to as "three points Ps, Pm, and Pe". The extraction work of extracting the provisional three points and the work of determining them as the formal three points Ps, Pm, and Pe will be described later.

The start point Ps is a point where the vibration intensity first exceeds a first threshold value Y1 in the individual waveform Wo. The maximum point Pm is a point where the vibration intensity is greater than a second threshold value Y2, which is greater than the first threshold value Y1, and the vibration intensity is maximum in the individual waveform Wo. Therefore, when the point where the vibration intensity becomes maximum in the individual waveform Wo is smaller than the second threshold value Y2, the maximum point Pm is not extracted for the individual waveform Wo. As a result, the individual waveform Wo is regarded as not substantially a knocking waveform without being determined whether or not the feature matches with a feature of the knocking waveform. The end point Pe is the point where the vibration intensity finally falls below the first threshold value Y1 in the individual waveform Wo.

The end determination unit 34 determines that the one individual waveform Wo has ended on condition that the vibration intensity exceeds the first threshold value Y1, falls below the first threshold value Y1, and then the vibration intensity falling below the first threshold value continues for equal to or greater than a predetermined end determination time Xf. The end determination time Xf is a time (for example, about 90 μs) having a length equal to or greater than the reciprocal (in this case, about 75 μs) of a lower limit frequency (for example, about 14 kHz–1 kHz) in the vibration extracted by the bandpass filter 32, that is, the vibration used in the end determination unit 34, and twice or less than the reciprocal (in this case, about 150 μs) thereof. The reciprocal of this lower limit frequency corresponds to an upper limit of one vibration cycle. Therefore, the end determination time Xf is a time having a length equal to or greater than the upper limit of one vibration cycle of the vibration handled by the end determination unit 34 and twice or less than the upper limit.

Figure 4A:
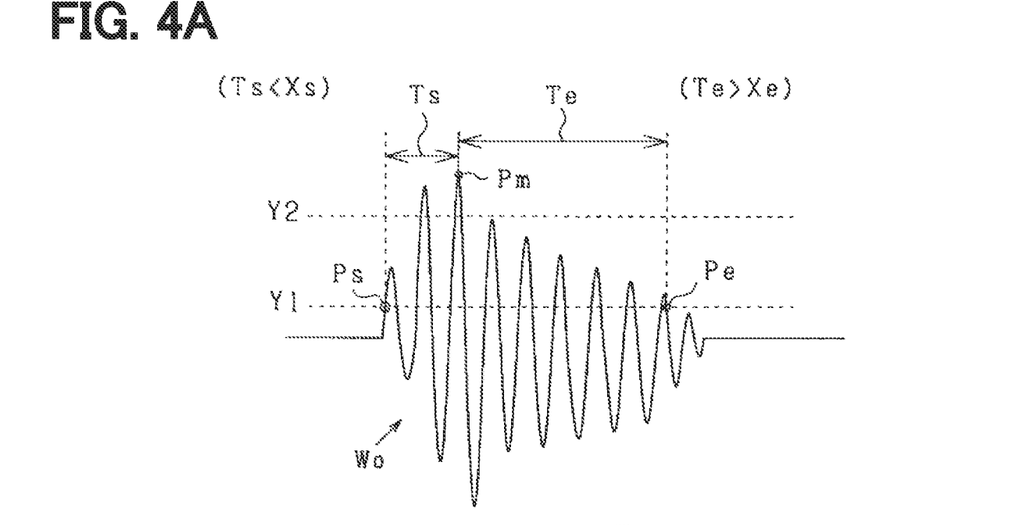
FIGS. 4A to 4C are graphs each showing an example of individual waveform from which features have been extracted.
Figure 4B:
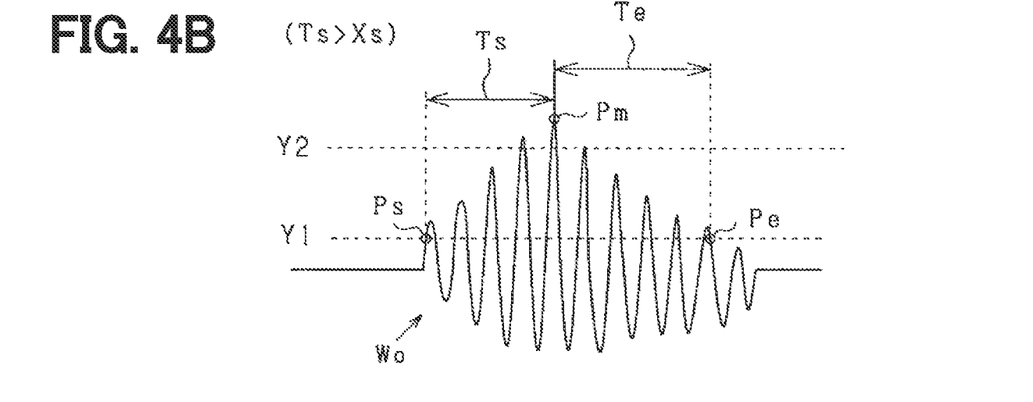
Figure 4C:
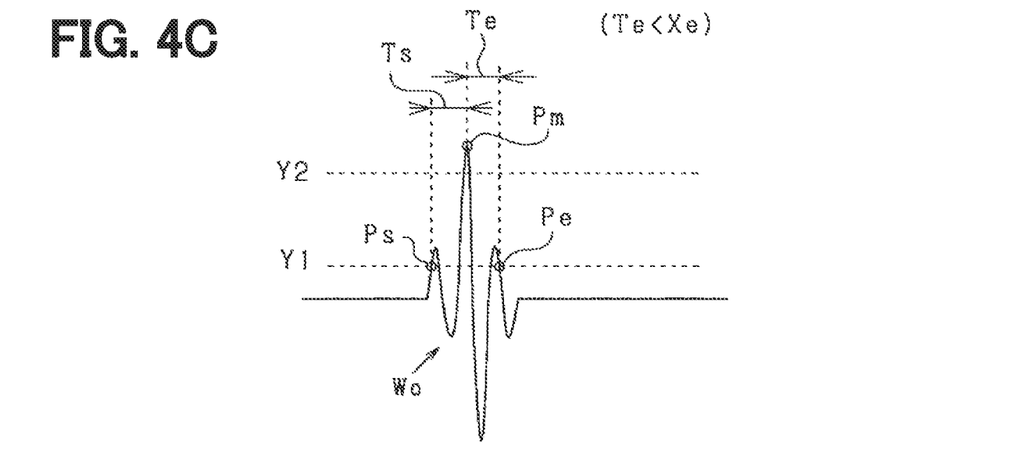

FIG. 4 is a graph showing examples of individual waveforms Wo in which three points Ps, Pm, and Pe are extracted by the feature extraction unit 33. In the following, the time from the start point Ps to the maximum point Pm is referred to as "increase time Ts", and the time from the maximum point Pm to the end point Pe is referred to as "decay time Te". The three points Ps, Pm, and Pe correspond to a primary features of the individual waveform Wo, and the increase time Ts and the decay time Te correspond to a secondary features of the individual waveform Wo.

As shown in FIG. 4A, the knocking determination unit 35 determines that the individual waveform Wo is a knocking waveform on condition that the increase time Ts of the individual waveform Wo is smaller than a predetermined increase time threshold Xs, and the decay time Te of the individual waveform Wo is greater than a predetermined decay time threshold Xe. On the other hand, when the increase time Ts of the individual waveform Wo is greater than the increase time threshold value Xs as shown in FIG. 4B, or the decay time Te of the individual waveform Wo is smaller than the predetermined decay time threshold Xe as shown in FIG. 4C, the knocking determination unit 35 determines that the individual waveform Wo is not a knocking waveform.

Figure 5:
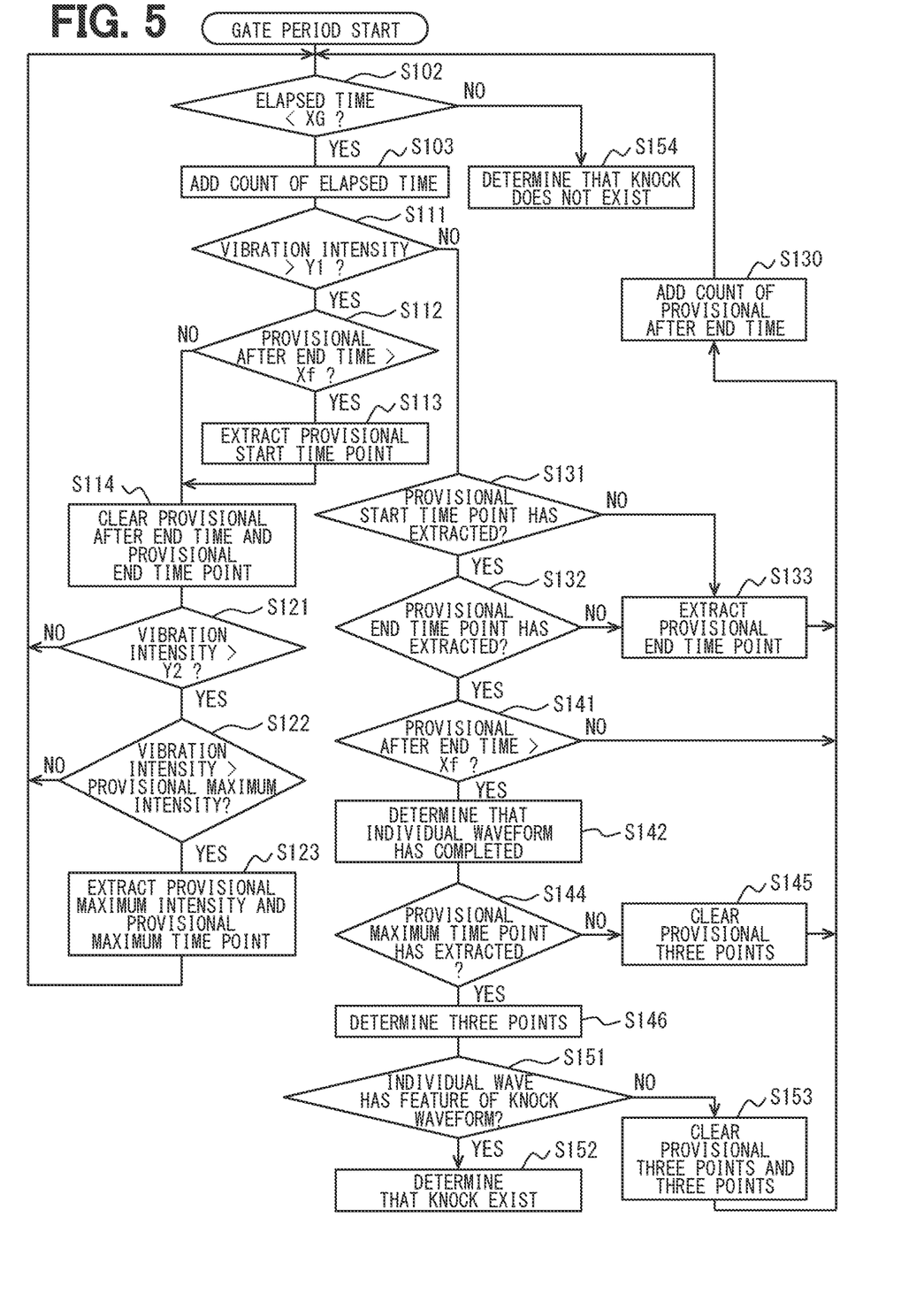
FIG. 5 is a flowchart showing a control performed by the knocking determination device.

FIG. 5 is a flowchart showing control by the knocking determination unit 35. In the following, a time point of the provisional start point is referred to as "provisional start time point", a vibration intensity at the provisional maximum point is referred to as "provisional maximum intensity", a time point of the provisional maximum point is referred to as "provisional maximum time point", and a time point of the provisional end point is referred to as "provisional end time point". Further, an elapsed time from the provisional end time point is referred to as "provisional after end time". Further, a time point of the start point Ps is referred to as "start time point", a vibration intensity at the maximum point Pm is referred to as "maximum intensity", a time point of the maximum point Pm is referred to as "maximum time point", and a time point of the end point Pe is referred to as "end time point". Further, an elapsed time from the start of the gate period G is simply referred to as "elapsed time". Each of the above parameters, except for the provisional after end time, in the initial state where this flow is started, are cleared and unextracted, in other words, "0" is extracted. On the other hand, the provisional after end time, in the initial state where this flow is started, is initially set to a value equal to or greater than the end determination time Xf.

First, the basic work based on S101 to S103 will be described. When the gate period G is started (S101), first, it is determined whether or not the elapsed time is smaller than a predetermined gate threshold value XG (S102). When it is determined that the elapsed time is smaller than the gate threshold value XG (S102: YES), the count indicating the elapsed time is added (S103), and the processing proceeds to next S111.

Next, the extraction work at the provisional start time point based on S111 to S114 will be described. In S111, it is determined whether or not the current vibration intensity is greater than the first threshold value Y1 (S111). When it is determined that the current vibration intensity is greater than the first threshold value Y1 (S111: YES), it is determined whether or not the provisional after end time, which is currently counted, is greater than the end determination time Xf (S112). when the provisional after end time is greater than the end determination time Xf (S112: YES), the current elapsed time is extracted as the provisional start time point (S113), and the processing proceeds to the next S114. On the other hand, when the provisional after end time is smaller than the end determination time Xf (S112: NO), S113 is skipped and the processing proceeds to S114 as it is. In S114, the provisional after end time, which is currently counted, and the provisional end point, which is currently extracted, are cleared, and the processing proceeds to next S121.

Next, the extraction work of the provisional maximum intensity and the provisional maximum time point based on S121 to S123 will be described. In S121, it is determined whether or not the current vibration intensity is greater than the second threshold value Y2 (S121). When it is determined that the current vibration intensity is smaller than the second threshold value Y2 (S121: NO), the processing returns to S102 without extracting the provisional maximum intensity and the like. On the other hand, when it is determined in S121 that the current vibration intensity is greater than the second threshold value Y2 (S121: YES), it is determined whether or not the current vibration intensity is greater than the provisional maximum intensity currently extracted (S122). When it is determined that the provisional maximum intensity is smaller than the provisional maximum intensity currently extracted (S122: NO), the processing returns to S102 without extracting (updating) the provisional maximum intensity. On the other hand, when it is determined in S122 that the current vibration intensity is greater than the provisional maximum intensity currently extracted (S122: YES), the current vibration intensity is extracted as the provisional maximum intensity, and the current elapsed time is extracted as the provisional maximum time point (S123).

Next, the extraction work at the provisional end time point based on S131 to S133 will be described. When it is determined in S111 that the vibration intensity is smaller than the first threshold value Y1 (S111: NO), it is determined whether or not the provisional start time point has been extracted (S131). When it is determined that the extraction has not been completed (S131: NO), the counter indicating the provisional after end time is added (S130) without extracting the provisional end time point, and the processing returns to S102. On the other hand, when it is determined in S131 that the provisional start time point has been extracted (S131: YES), it is determined whether or not the provisional end time point has been extracted (S132). When it is determined that the extraction has not been completed (S132: NO), the current elapsed time is extracted as the provisional end time point (S133), the counter indicating the provisional after end time is added (S130), and the processing returns to S102.

Next, the end determination of the individual waveform Wo based on S141 to S142 will be described. When it is determined in S132 that the provisional end time point has been extracted (S132: YES), it is determined whether or not the provisional after end time is greater than the end determination time Xf (S141). When it is determined that the provisional after end time is smaller than the end determination time Xf (S141: NO), it cannot be confirmed that the individual waveform Wo has ended, so the counter indicating the provisional after end time is added (S130), and the processing returns to S102. On the other hand, when it is determined in S141 that the provisional after end time is equal to or greater than the end determination time Xf (S141: YES), it is determined that the individual waveform Wo has been completed (S142).

Next, the work of determining the provisional three points based on S144 to S146 as the formal three points Ps, Pm, and Pe will be described. After S143, it is determined whether or not the provisional maximum time point has been extracted (S144). When it is determined that the extraction has not been completed (S144: NO), it can be determined that the completed individual waveform Wo is not a knocking waveform without performing a knocking determination. Thus, the parameters other than the elapsed time and the provisional after end time are cleared (S145) and the counter indicating the provisional after end time is added (S130) without confirming the three points Ps, Pm, and Pe, and then the processing returns to S102. On the other hand, when it is determined in S144 that the provisional maximum time point has been extracted, the provisional start time point, the provisional maximum intensity, the provisional maximum time point, and the provisional end time point are determined as the start time point, the maximum intensity, the maximum time point, and the end time point, respectively (S146). As a result, the provisional three points are determined as the formal three points Ps, Pm, and Pe.

Next, the knocking determination based on S151 to S154 will be described. After S146, it is determined whether or not the feature of the extracted individual waveform Wo matches with the feature of the knocking waveform (S151). Specifically, as described above, the increase time Ts and the decay time Te are calculated based on the three points Ps, Pm, and Pe, and it is determined whether or not the feature of the extracted individual waveform Wo matches with the feature of the knocking waveform (S151) based on whether the increase time Ts is smaller than the increase time threshold Xs, and the decay time Te is greater than the time threshold Xe (S151). When it is determined that the feature of the extracted individual waveform Wo matches with the feature of the knocking waveform (S151: YES), it is determined that the knock is present (S152). In this case, the knocking control unit 36 performs the knocking suppression control described above.

On the other hand, when it is determined in S151 that the feature of the extracted individual waveform Wo does not match with the feature of the knocking waveform (S151: NO), the parameters other than the elapsed time and the provisional after end time are cleared (S153), and the counter indicating the provisional after end time is added (S130), and the processing returns to S102. Then, when time elapses without proceeding to S152 and it is determined in S102 that the elapsed time is greater than the gate threshold value XG (S102: NO), it is determined that there knock does not exist (S154). In this case, the knocking control unit 36 performs the above-mentioned normal control.

Figure 6:
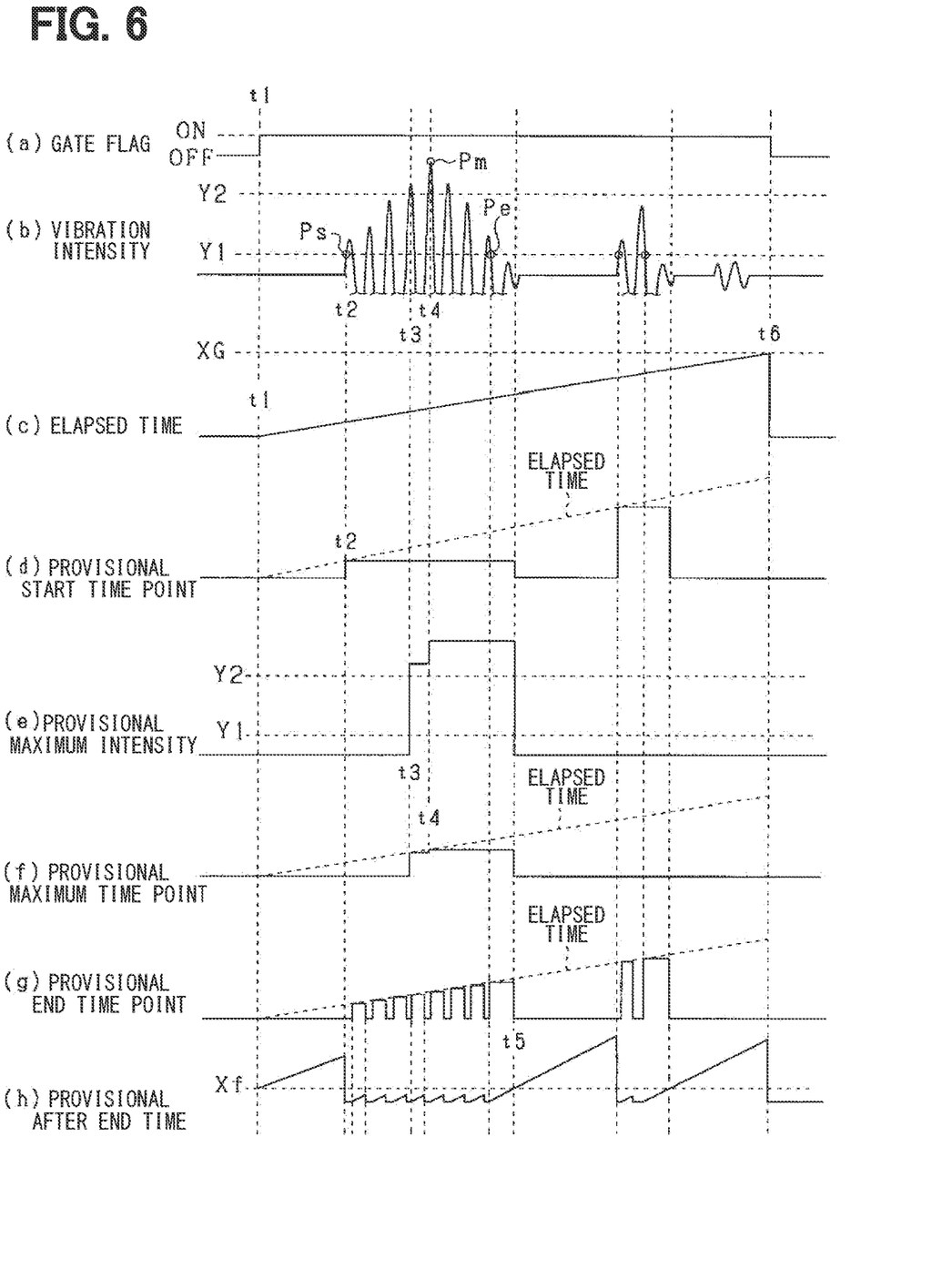
FIG. 6 is a time chart showing changes in each parameter along with the above flowchart.

FIG. 6 is a time chart showing changes in each parameter with the above flow. Here, it is assumed that the vibration waveform shown in FIG. 6(b) is generated. When the gate period G is started at a predetermined first timing t1, the gate flag shown in FIG. 6(a) is turned on, and the elapsed time shown in FIG. 6(c) and the provisional after end time shown in FIG. 6(h) start to increase. When the vibration intensity shown in FIG. 6(b) exceeds the first threshold value Y1 at a subsequent second timing t2, the elapsed time at that time point is extracted as the provisional start time point shown in FIG. 6(d). Along with this configuration, the provisional after end time shown in FIG. 6(h) is cleared.

Immediately before a subsequent third timing t3, the vibration intensity shown in FIG. 6(b) exceeds the second threshold value Y2, and at the third timing t3 immediately after that, the vibration intensity exceeds the provisional maximum intensity (0) shown in FIG. 6(e). As a result, as shown in FIGS. 6(e) and 6(f), the vibration intensity and the elapsed time at that time point are extracted as the provisional maximum intensity and the provisional maximum time point, respectively. Similarly, at a fourth timing t4, the vibration intensity and the elapsed time at that time are extracted (updated) as the provisional maximum intensity and the provisional maximum time point, respectively.

Then, after the second timing t2, every time the vibration intensity shown in FIG. 6(b) falls below the first threshold value Y1, as shown in FIG. 6(g), the elapsed time at that time is extracted as the provisional end time point, and as shown in FIG. 6(h), the provisional after end time starts to increase. However, every time the vibration intensity shown in FIG. 6(b) exceeds the first threshold value Y1 before the provisional after end time reaches the end determination time Xf, the provisional end time point and the provisional after end time shown in FIGS. 6(g) and 6(f) are cleared. At a subsequent fifth timing t5, when the provisional after end time shown in FIG. 6(h) reaches the end determination time Xf, the provisional three points are confirmed as the formal three points Ps, Pm, and Pe, and the knocking determination is performed. Along with this configuration, each parameter shown in FIGS. 6(d) to 6(g), that is, the parameters other than the elapsed time and the provisional after end time are cleared. After that, the extraction work of each of these parameters is started again.

At a subsequent sixth timing t6, when the elapsed time shown in FIG. 6(c) reaches the gate threshold value XG, the gate flag shown in FIG. 6(a) is turned off, each parameter shown in FIGS. 6(d) to 6(g) is cleared, and the knocking determination in this gate period G ends.

Figure 7A:
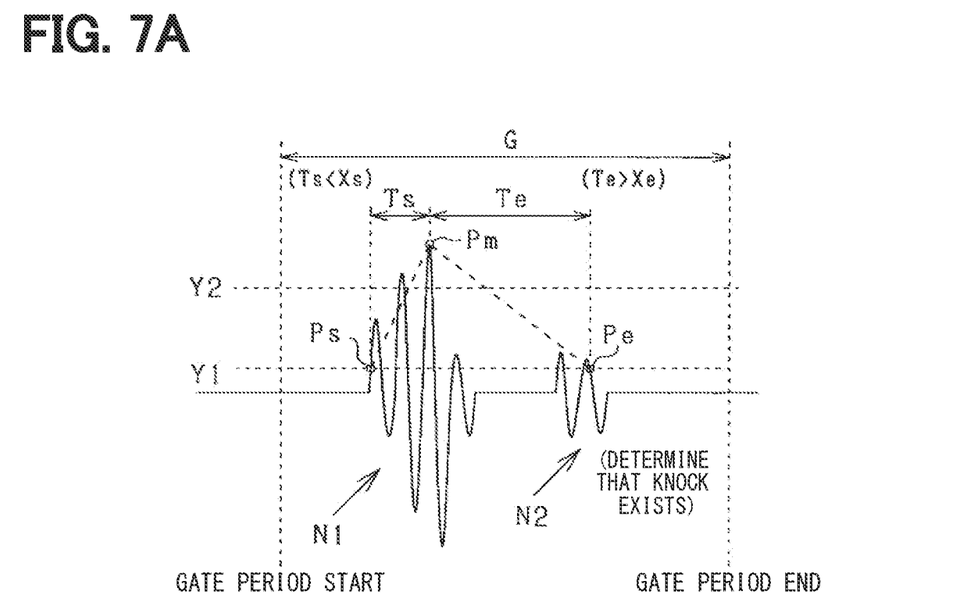
FIGS. 7A and 7B are graphs each showing a vibration waveform including a plurality of noises.
Figure 7B:
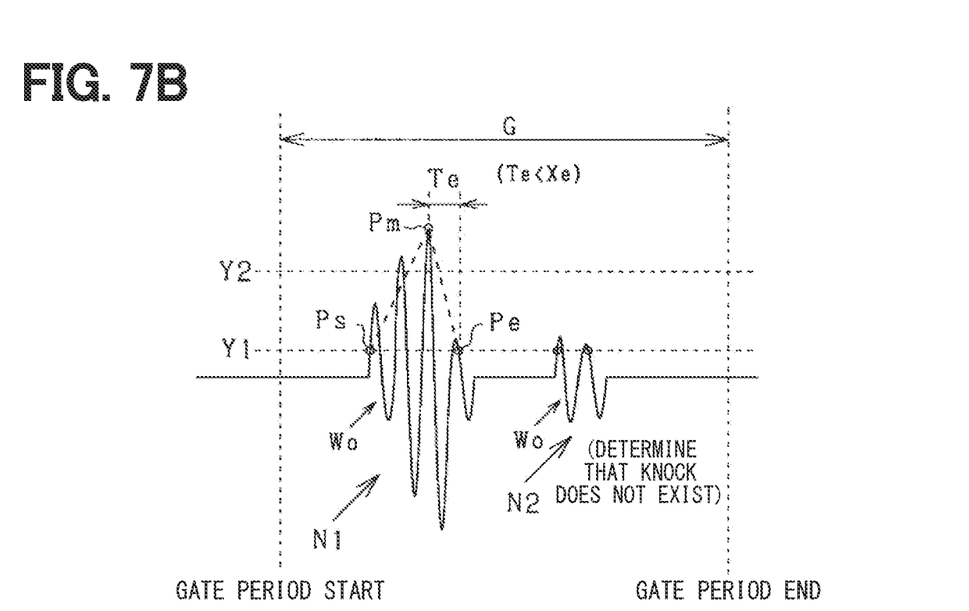

FIGS. 7A and 7B are graphs each showing a vibration waveform when a first noise N1 is first generated and then a second noise N2 is generated in the gate period G. The first noise N1 is noise having a large vibration intensity and a rapid increase and attenuation of the vibration intensity. On the other hand, the second noise N2 is noise having a small vibration intensity.

FIG. 7A shows a case where the knocking determination is performed with a knocking determination device of a comparative example for this vibration waveform. The knocking determination device of this comparative example does not have a function of the end determination unit 34 or the like in the present embodiment. Therefore, in this comparative example, during the entire range of the gate period G, a point where the vibration intensity first exceeds the first threshold value Y1 is set as the start point Ps, and a point where the vibration intensity is maximized is set as the maximum point Pm, and a point where the intensity finally falls below the first threshold value Y1 is set as the end point Pe.

Therefore, in this comparative example, the point where the vibration intensity of the first noise N1, which is generated first, first exceeds the first threshold value Y1 becomes the start point Ps, and the point where the vibration intensity of the first noise N1 becomes the maximum point Pm. Then, the point where the vibration intensity of the second noise N2, which is generated next, falls below the first threshold value Y1 becomes the end point Pe. In this case, the increase time Ts becomes smaller than the increase time threshold value Xs and the decay time Te becomes greater than the decay time threshold value Xe, so that the vibration waveform is erroneously determined to be a knocking waveform. That is, the vibration waveforms including the plurality of noises N1 and N2 is mistakenly recognized as one knocking waveform, and it is determined that the knock exists.

In that respect, in the present embodiment, as shown in FIG. 7B, the vibration waveform due to the first noise N1 and the vibration waveform due to the second noise N2 can be recognized as separate waveforms Wo due to the functions of the end determination unit 34 and the like. It is determined that the first noise N1 is not a knocking waveform since the attenuation time Te is smaller than the attenuation time threshold value Xe. Further, it is determined that, without performing a knock determination, the second noise N2 is not a knocking waveform since the maximum point is not extracted. Therefore, it is determined that a knock does not exist. As described above, according to the present embodiment, unlike the comparative example, the configuration can prevent the vibration waveform including the plurality of noises N1 and N2 from being erroneously determined as one knocking waveform.

Figure 8A:
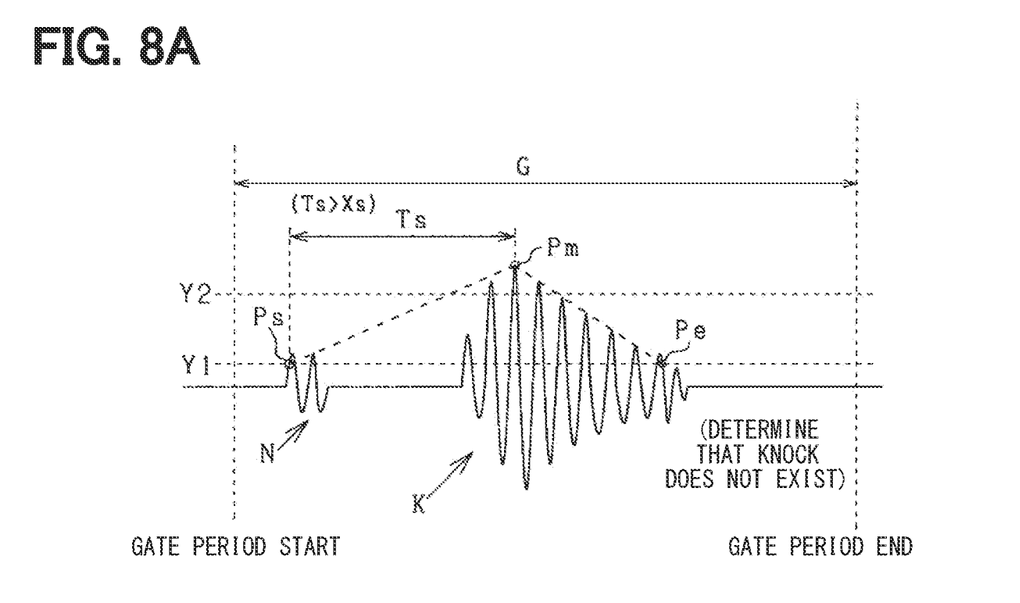
FIGS. 8A and 8B are graphs each showing a vibration waveform including both noise and knock.
Figure 8B:
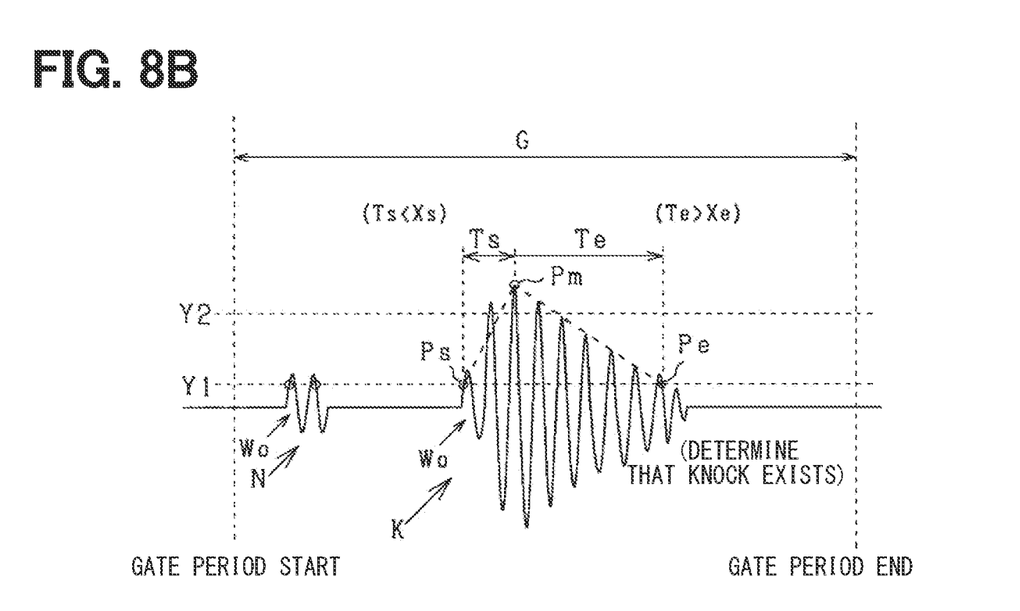

FIGS. 8A and 8B are graphs each showing a vibration waveform when a noise N is first generated and then a knock K is generated in the gate period G.

FIG. 8A shows a case where the knocking determination is performed with a knocking determination device of a comparative example for this vibration waveform, similarly to the above configuration. In this comparative example, a point where the vibration intensity of the noise N, which is generated first, first exceeds the first threshold value Y1 is set as the start point Ps, a point where the vibration intensity of the knock K, which is generated next, is the maximum is set as the maximum point Pm, and a point where the vibration intensity of the knock K finally falls below the first threshold value Y1 is set as the end point Pe. In this case, the increase time Ts becomes greater than the increase time threshold value Xs. Therefore, it is erroneously determined that the vibration waveform is not a knocking waveform. That is, the vibration waveform caused by both the noise N and the knock K is mistakenly recognized as one noise waveform, and it is determined that the knock exists.

In that respect, in the present embodiment, as shown in FIG. 8B, the vibration waveform due to the noise N and the vibration waveform due to the knock K can be recognized as separate waveforms Wo due to the functions of the end determination unit 34 and the like. Then, it is determined that the noise N, which is generated first, is not a knocking waveform because the maximum point Pm is not extracted. However, it is determined that the knock K is a knocking waveform because the increase time Ts is smaller than the increase time threshold value Xs and the decay time Te is greater than the decay time threshold value Xe. Therefore, it is determined that a knock exists. Therefore, unlike the case of the comparative example, it is possible to avoid erroneously determining the vibration waveforms due to both the noise N and the knock K as one noise waveform.

According to the present embodiment, it is determined that a knock is present on condition that the feature of any of the individual waveforms Wo included in the vibration waveform generated during the gate period G is determined to be the feature of the knocking waveform. Therefore, compared to the case where the knocking determination is performed based on whether or not the feature of the whole set of vibration waveforms generated in the gate period G matches with the feature of the knocking waveform (comparative example), the configuration can suppress the erroneous determination that the vibration waveform including a plurality of noises is one knocking waveform and the erroneous determination that the vibration waveform including both noise and knock is one noise waveform. Therefore, the accuracy of knocking determination can be improved.

In addition, the following effects can be obtained. The end determination unit 34 determines that the individual waveform Wo has ended on condition that the vibration intensity exceeds the predetermined first threshold value Y1, falls below the first threshold value Y1, and then the vibration intensity falling below the first threshold value continues for equal to or greater than a predetermined end determination time Xf. Therefore, the end of the individual waveform Wo can be easily determined.

Further, as described above, the end determination time Xf is greater (for example, about 90 μs) than the upper limit of one vibration cycle (for example, about 75 μs) of the vibration handled by the end determination unit 34. Therefore, the end determination unit 34 can confirm whether or not the vibration intensity does not exceed the first threshold value Y1 during the time of one vibration cycle or more. Thereby, it is possible to accurately determine whether or not the individual waveform Wo has ended.

Further, the end determination time Xf is smaller (for example, about 90 μs) than twice the reciprocal of the above lower limit frequency (for example, about 150 μs). Therefore, it is possible to avoid wasting a lot of time on the end determination. Therefore, the subsequent work of fixing the provisional three points to the formal three points Ps, Pm, and Pe and the knocking determination can be started promptly.

In addition, the following effects can be obtained. When the maximum value of the vibration intensity in the individual waveform Wo is small, it is highly possible that the individual waveform Wo is not a knocking waveform. In that respect, in the present embodiment, on condition that the provisional maximum intensity is extracted, that is, on condition that the maximum value of the vibration intensity in the individual waveform Wo is greater than the second threshold value Y2, the features Ps, Pm, and Pe in the individual waveform Wo are extracted (determined). As a result, when the maximum value of the vibration intensity in the individual waveform Wo is smaller than the second threshold value Y2, the knocking determination can be prevented from being performed, whereby the knocking determination can proceed efficiently and quickly.

Further, the feature extraction unit 33 extracts the provisional features of the individual waveform Wo and determines the provisional features as the formal features, as the extraction work of the features Ps, Pm, and Pe of the individual waveform Wo. Then, on condition that the end determination unit 34 determines that the one individual waveform Wo has ended, the feature extraction unit 33 determines the provisional features of the one individual waveform Wo as the formal features, and starts the extraction work of the provisional features of the next individual waveform Wo. As a result, the extraction work of the features Ps, Pm, and Pe of each individual waveform Wo can be efficiently performed.

Further, by using the three points Ps, Pm, and Pe of the start point Ps, the maximum point Pm, and the end point Pe, the features of the individual waveform Wo can be efficiently captured with a small amount of information. Therefore, the burden of processing of the feature extraction unit 33 and the knocking determination unit 35 can be reduced, and these processes can be performed promptly.

Further, by using the increase time Ts and the decay time Te, the knocking determination can be efficiently performed with a small amount of information. Therefore, the burden of processing of the knocking determination unit 35 can be reduced, and the knocking determination can be performed promptly.

Further, the knocking control unit 36 performs knocking suppression control when the knocking determination unit 35 determines that a knock is present. Therefore, the knocking suppression control can be performed by effectively utilizing the result of the knocking determination.

Second Embodiment

A second embodiment of the present disclosure will be described as follows. In the following embodiments, the same or corresponding members as those in the previous embodiment are designated by the same reference numerals. This embodiment will be described mainly on the points different from the first embodiment.

Figure 9A:
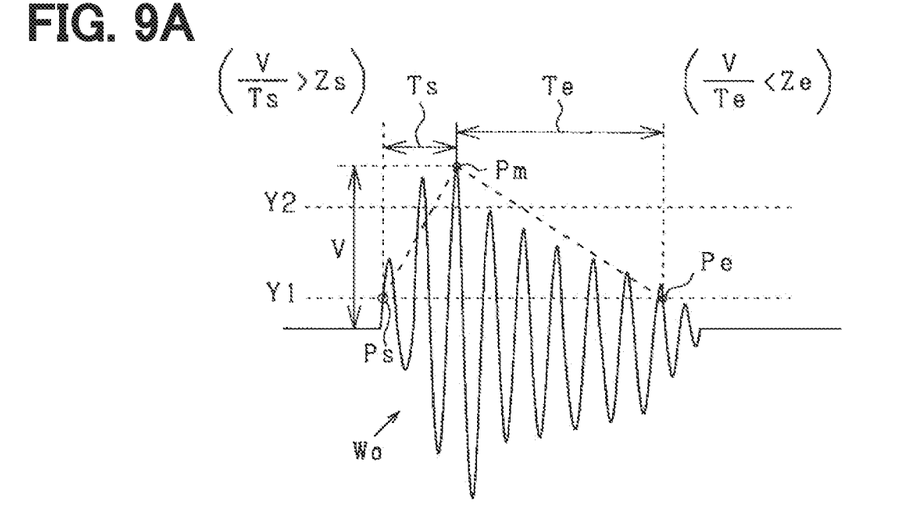
FIGS. 9A to 9C are graphs each showing an example of an individual waveform from which features have been extracted in a second embodiment.
Figure 9B:
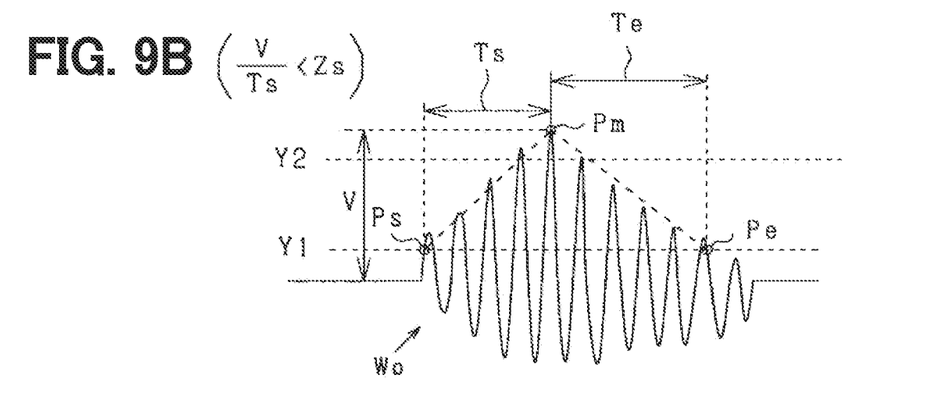
Figure 9C:
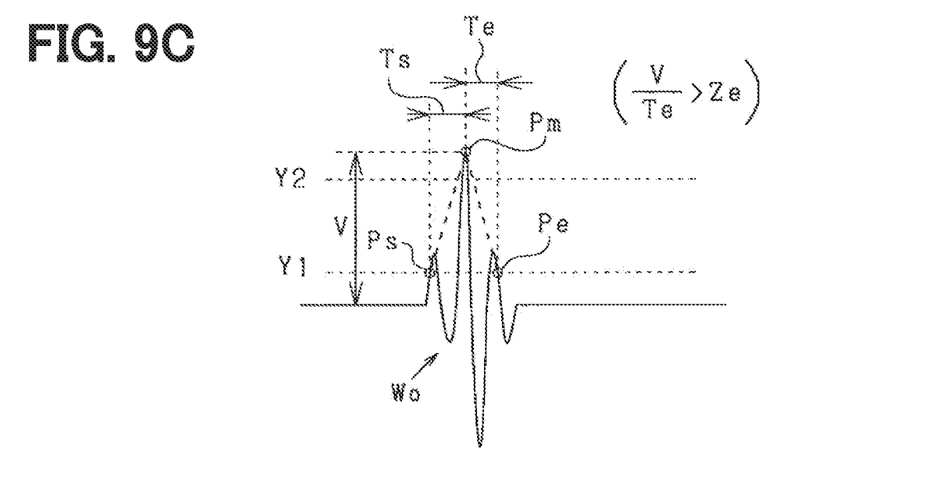

FIGS. 9A to 9C are graphs each showing an example of an individual waveform Wo in which three points Ps, Pm, and Pe are extracted by the feature extraction unit 33. In the following, the vibration intensity at the maximum point Pm is referred to as "maximum intensity V", the maximum intensity V divided by the increase time Ts is referred to as "increase rate V/Ts", and the maximum intensity V is divided by the damping time Te is referred to as "attenuation rate V/Te".

As shown in FIG. 9A, the knocking determination unit 35 determines that an individual waveform Wo is a knocking waveform on condition that the increase rate V/Ts of the individual waveform Wo is greater than a predetermined increase rate threshold value Zs, and the attenuation rate V/Te is greater than a predetermined attenuation rate threshold value Ze. On the other hand, when, as shown in FIG. 9B, the increase rate V/Ts of the individual waveform Wo is smaller than the increase rate threshold value Zs, or as shown in FIG. 9C, the attenuation rate V/Te is greater than the attenuation rate threshold value Ze, the knocking determination unit 35 determines that the individual waveform Wo is not a knocking waveform.

According to the present embodiment, the knocking determination can be performed more accurately by performing the knocking determination by using the maximum intensity V in addition to the increase time Ts and the decay time Te.

Other Embodiments

The above embodiments can be modified and implemented as follows, for example. For example, in each embodiment, the vibration strength in consideration of plus or minus is used as the vibration intensity, but each embodiment may be implemented by using the absolute value of the vibration strength as the vibration intensity.

Further, for example, in the first embodiment or the like, it is determined that the individual waveform Wo has ended on condition that the state in which the vibration intensity falls below the first threshold value Y1 continues for the end determination time Xf or more. Alternatively, the following condition may be set. That is, an alternative or additional condition may be that the initial maximum value of the vibration intensity after the provisional end point is smaller than the first threshold value Y1.

Further, for example, in the first embodiment or the like, the knocking determination is performed by using only three points Ps, Pm, and Pe, but the knocking determination may be performed by using four points or more including additional points. Further, for example, in the first embodiment, the increase time threshold value Xs and the decay time threshold value Xe are fixed, but may be changed based on the vibration intensity at the maximum point Pm.

Further, for example, in the first embodiment or the like, on condition that, in addition to determining that the individual waveform Wo has ended, the provisional maximum point of the individual waveform Wo has been extracted, that is, the vibration intensity exceeded the second threshold value Y2 in the past, the provisional feature of the individual waveform Wo is determined to be the formal features Ps, Pm, and Pe, and the knocking determination is performed. Even when the provisional maximum point has not been extracted, the provisional feature may be determined as the formal features Ps, Pm, and Pe, and the knocking determination may be performed without this additional condition.

Further, in the first embodiment or the like, the knocking control unit 36 performs the knocking suppression control on condition that the knocking determination unit 35 determines that a knock exists once. Alternatively, the knocking control unit 36 may perform the knocking suppression control on condition that the knocking determination unit 35 determines that a knock exist for a plurality of times. In this case, the knocking suppression control can be shifted more carefully.

Although the present disclosure has been described in accordance with the examples, it is understood that the present disclosure is not limited to such examples or structures. The present disclosure encompasses various modifications and variations during the scope of equivalents. In addition, while the various combinations and configurations, which are preferred, other combinations and configurations, including more, less or only a single element, are also during the spirit and scope of the present disclosure.

The ECU 30 described in the present disclosure and a technique for the ECU 30 may be implemented by a dedicated computer provided by configuring a processor and a memory programmed to perform one or more functions made concrete by a computer program. Or, the ECU 30 described in the present disclosure and a technique for the ECU 30 may be implemented by a dedicated computer provided by configuring a processor with one or more dedicated hardware logic circuits. Alternatively, the ECU 30 described in the present disclosure and a technique for the ECU 30 may be implemented by one or more dedicated computers configured by combining a processor and a memory programmed to perform one or more functions with a processor constituted of one or more hardware logic circuits. A computer program may be stored in a computerreadable non-transitional tangible recording medium as an instruction executed by a computer.

What is claimed is:

1. A knocking determination device comprising:
a detection unit configured to detect a vibration generated in an internal combustion engine during each unit period as a predetermined period in each combustion cycle of the internal combustion engine;
a knocking determination unit configured to perform a knocking determination of a presence or absence of a knock based on a vibration waveform in a predetermined frequency band component of the vibration detected;
an end determination unit, when a plurality of individual waveforms are included in the vibration waveform during one unit period, configured to determine an end of an individual waveform, and recognize a boundary between adjacent two of the plurality of individual waveforms, the individual waveform being a waveform of each predetermined series of vibrations included in the vibration waveform; and
a feature extraction unit configured to perform an extraction work that extracts a feature of the individual waveform based on recognizing the boundary, wherein
the knocking determination unit determines whether the feature of the individual waveform matches with a feature of a knocking waveform, and determines that the knock exists on condition determining that the feature of the individual waveform matches with the feature of the knocking waveform.

2. The knocking determination device according to claim 1, wherein
the feature extraction unit extracts the feature of the individual waveform on condition that a maximum value of a vibration intensity in the individual waveform is greater than a second threshold value.

3. The knocking determination device according to claim 1, wherein
the feature extraction unit extracts the feature of the individual waveform on condition that a maximum value of a vibration intensity in the individual waveform is greater than a second threshold value that is greater than the first threshold value.

4. The knocking determination device according to claim 1, wherein
the feature extraction unit performs, as the extraction work of the feature, an extraction work that extracts a provisional feature of the individual waveform and a work that determines the provisional feature of the individual waveform as the feature of the individual waveform, and
the feature extraction unit determines the provisional feature of one individual waveform as the feature of the individual waveform, and starts an extraction work that extracts a provisional feature of a next individual waveform on condition that the end determination unit determines that the one individual waveform ends.

5. A knocking control device comprising:
the knocking determination device according to claim 1; and
a knocking control unit configured to control to suppress the knock when the knocking determination unit determines that the knock exists.

6. The knocking determination device according to claim 1, wherein
the end determination unit determines that one of the individual waveforms ends on condition that a vibration intensity in the waveform exceeds a predetermined first threshold value, falls below the first threshold value, and then the vibration intensity falling below the first threshold value continues for equal to or greater than a predetermined end determination time.

7. The knocking determination device according to claim 6, wherein
the predetermined frequency band component of the vibration is a vibration equal to or more than a predetermined lower limit frequency and equal to or less than a predetermined upper limit frequency, and
the predetermined end determination time is a time having a length equal to or more than a reciprocal of the lower limit frequency and twice or less the reciprocal of the lower limit frequency.

8. The knocking determination device according to claim 1, wherein
a point at which a vibration intensity in the individual waveform first exceeds a predetermined first threshold value is defined as a start point,
a point at which the vibration intensity in the individual waveform becomes maximum is defined as a maximum point,
a point at which the vibration intensity in the individual waveform finally falls below the first threshold value is defined as an end point, and
the feature of the individual waveform includes the start point, the maximum point, and the end point.

9. The knocking determination device according to claim 8, wherein
the knocking determination unit performs the knocking determination by using at least an increase time which is a time from the start point to the maximum point, and a decay time which is a time from the maximum point to the end point.

10. The knocking determination device according to claim 9, wherein
the knocking determination unit performs the knocking determination by further using a vibration intensity at the maximum point.

11. A knocking determination device comprising:
a detection unit configured to detect a vibration generated in an internal combustion engine during a predetermined period in each combustion cycle of the internal combustion engine;
a knocking determination unit configured to perform a knocking determination of a presence or absence of a knock based on a vibration waveform in a predetermined frequency band component of the vibration detected, the predetermined frequency band component being a vibration equal to or more than a predetermined lower limit frequency and equal to or less than a predetermined upper limit frequency;
an end determination unit configured to determine an end of an individual waveform that is a waveform of each predetermined series of vibrations included in the vibration waveform, and recognize a boundary between the individual waveforms; and
a feature extraction unit configured to perform an extraction work that extracts a feature of the individual waveform based on recognizing the boundary, wherein
the end determination unit determines that one of the individual waveforms ends on condition that a vibration intensity in the waveform exceeds a predetermined first threshold value, falls below the first threshold value, and then the vibration intensity falling below the first threshold value continues for equal to or greater than a predetermined end determination time, the predetermined end determination time is a time having a length equal to or more than a reciprocal of the lower limit frequency and twice or less the reciprocal of the lower limit frequency, and the knocking determination unit determines whether the feature of the individual waveform matches with a feature of a knocking waveform, and determines that the knock exists on condition determining that the feature of the individual waveform matches with the feature of the knocking waveform.

\* \* \* \* \*